United States Patent [19]
White et al.

[11] 4,158,960
[45] Jun. 26, 1979

[54] MICROCIRCUIT FINE LEAK TEST APPARATUS

[75] Inventors: James W. White; Victor W. Ruwe, both of Huntsville, Ala.

[73] Assignee: The United States of America as represented by the Secretary of the Army, Washington, D.C.

[21] Appl. No.: 902,594

[22] Filed: May 4, 1978

[51] Int. Cl.² ............................................. G01M 3/20
[52] U.S. Cl. ....................................... 73/40.7; 73/49.3
[58] Field of Search ................... 73/49.2, 49.3, 40.7, 73/45.1

[56] References Cited

U.S. PATENT DOCUMENTS

| 3,486,365 | 12/1969 | Briggs ................................. 73/40.7 |
| 3,572,096 | 3/1971 | Meyer ................................. 73/40.7 |
| 3,578,758 | 5/1971 | Atshuler ............................. 73/40.7 |
| 3,762,212 | 10/1973 | Morley et al. ..................... 73/40.7 |
| 3,813,923 | 6/1974 | Pendelton ...................... 73/40.7 X |
| 3,847,013 | 11/1974 | Luy ................................... 73/40.7 |

Primary Examiner—Daniel M. Yasich
Attorney, Agent, or Firm—Nathan Edelberg; Robert P. Gibson; Harold W. Hilton

[57] ABSTRACT

A plurality of fine leak test chambers for fast individual testing of hermetically plated microelectronic devices. Each microcircuit component, having already been subjected to a controlled environment of 5 percent helium and 95 percent nitrogen and then assembled, is placed in the chambers and sealed therein. The chambers are evacuated and helium flow rate (if present) is measured by a spectrometer.

5 Claims, 4 Drawing Figures

MICROCIRCUIT FINE LEAK TEST APPARATUS

DEDICATORY CLAUSE

The invention described herein may be manufactured, used, and licensed by or for the Government for governmental purposes without the payment to us of any royalties thereon.

BACKGROUND OF THE INVENTION

Military Standards set forth Test Methods and Procedures for Microelectronics for Hermetically Seal of Microelectronic Devices. The purpose of the test procedure is to determine the effectiveness, or the hermeticity of the seal, of microelectronic devices with designed internal cavities. Apparatus required for testing the seal of the package shall consist of suitable pressure and vacuum chambers and a mass spectrometer type preset and properly calibrated for a helium leak rate sensitivity sufficient to read measured helium leak rate of $10^{-9}$ atm cc/sec and greater. The leak detector indicator shall be calibrated using a diffusion type certified standard leak, at least one during every working shift. Test procedure requires the package shall be placed in a sealed chamber, which is then pressurized with a tracer gas of 100 percent helium for the required time and pressure. The bomb pressure shall be 75 psig minimum, exposure time shall be one hour minimum and the device shall be measured within 30 minutes after it has been removed from the pressure vessel. Devices with an internal cavity volume of 0.1 cc or less shall be rejected if the measured tracer gas leak rate exceeds $5 \times 10^{-8}$ atm cc/sec. Devices with an internal cavity volume greater than 0.1 cc shall be rejected, if the measured tracer gas leak rate exceeds $5 \times 10^{-7}$ atm cc/sec.

In the present invention the bases of the microcircuit and lids are placed in a vacuum bake oven (125C) for 24 hours to remove the moisture from the microcircuit. The microcircuits are moved into a controlled environment of tracer gas comprised of 5 percent helium and 95 percent nitrogen. Package is then placed in the welding machine (while in the helium-nitrogen environment) where the lid is fusion welded to the base of the package to retain the helium-nitrogen mixture therein. The package is placed in a Pneumatic Gross Leak Tester. Packages that pass the Pneumatic Gross Leak Test are moved into the fine leak test environment of 100 percent nitrogen.

SUMMARY OF THE INVENTION

Apparatus of the present invention includes a housing having a frame having a plurality of test chambers therein. The test chambers include a stationary base and a vertically movable top. A port is provided in a portion of the base of each chamber to provide means for connection of each chamber to vacuum pumps. The microcircuits, having already been subjected to a helium and nitrogen environment are placed in the chambers and the top of the assembly is slid over all of the chambers so as to seal or close the chambers. Each movable chamber top (secured in the assembly top) is moved downwardly to secure the microcircuits in the chambers. Each chamber is evacuated and a spectrometer measures helium flow from each microcircuit. If helium flow rate exceeds a predetermined value, the package is rejected.

DESCRIPTION OF THE PREFERRED EMBODIMENT

Figure 1:
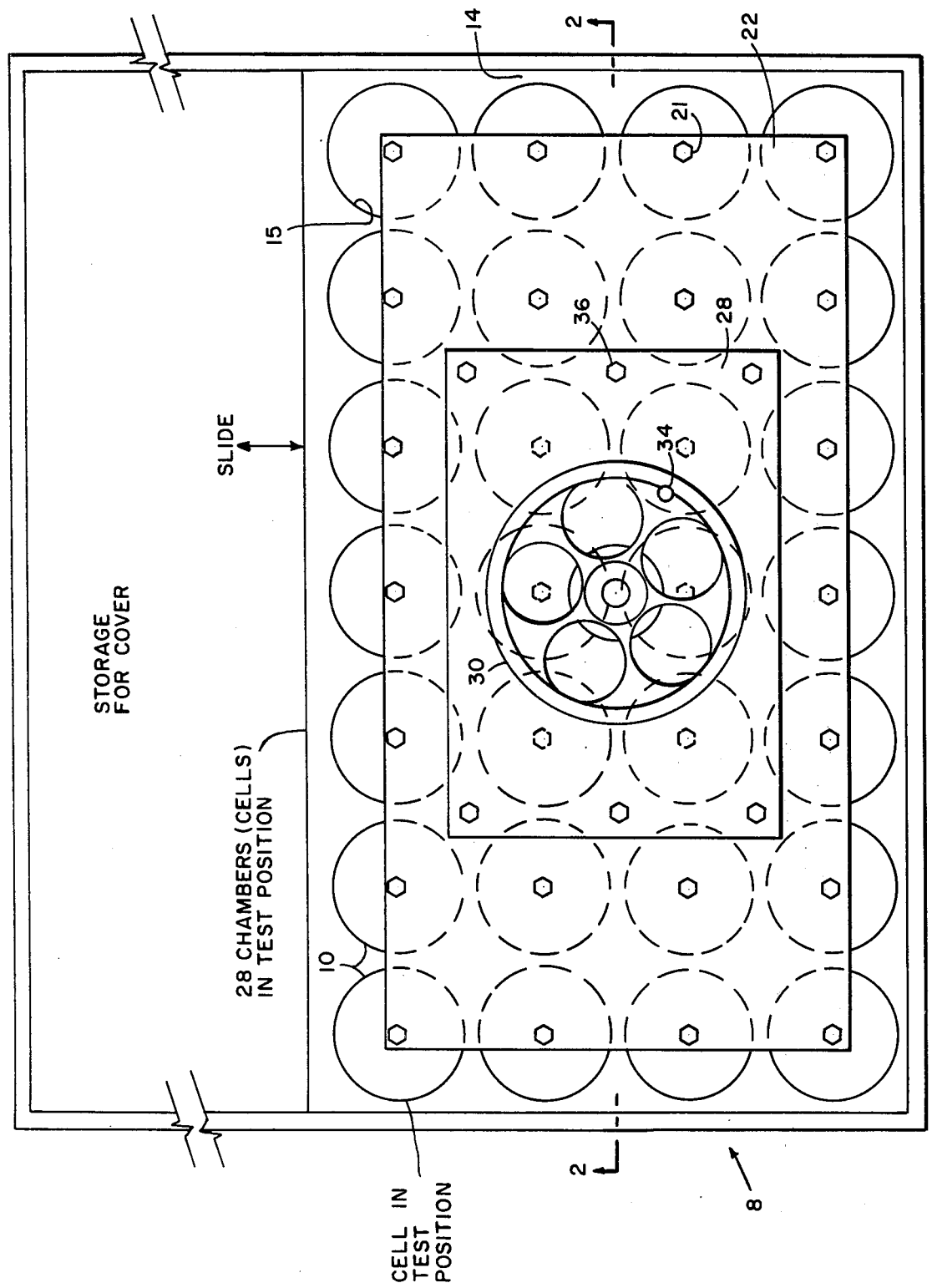
FIG. 1 is a plan view of the test chamber assembly showing the top of the assembly moved over the plurality of test chambers.
Figure 2:
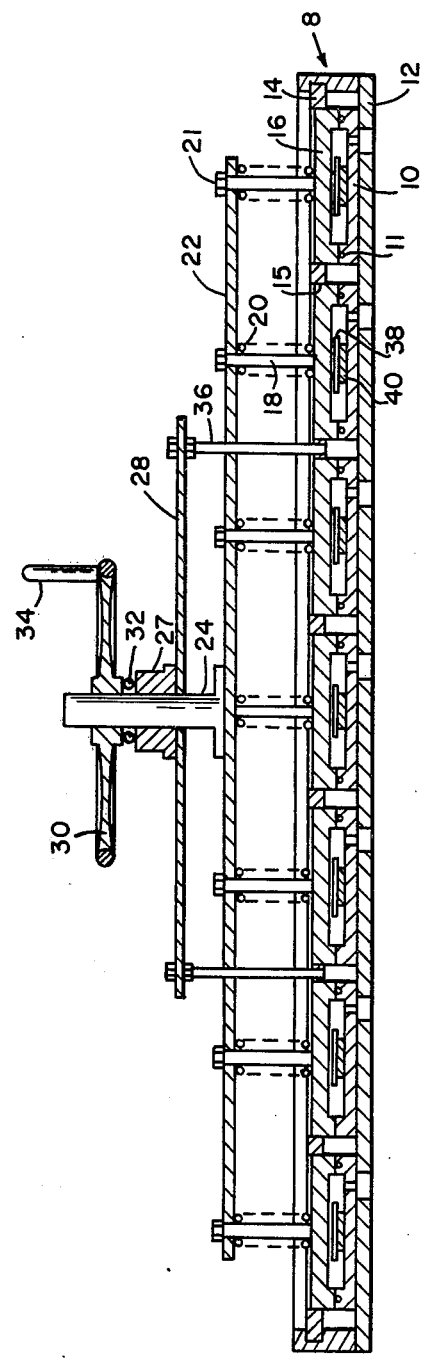
FIG. 2 is a sectional view along line 2—2 of FIG. 1.
Figure 3:
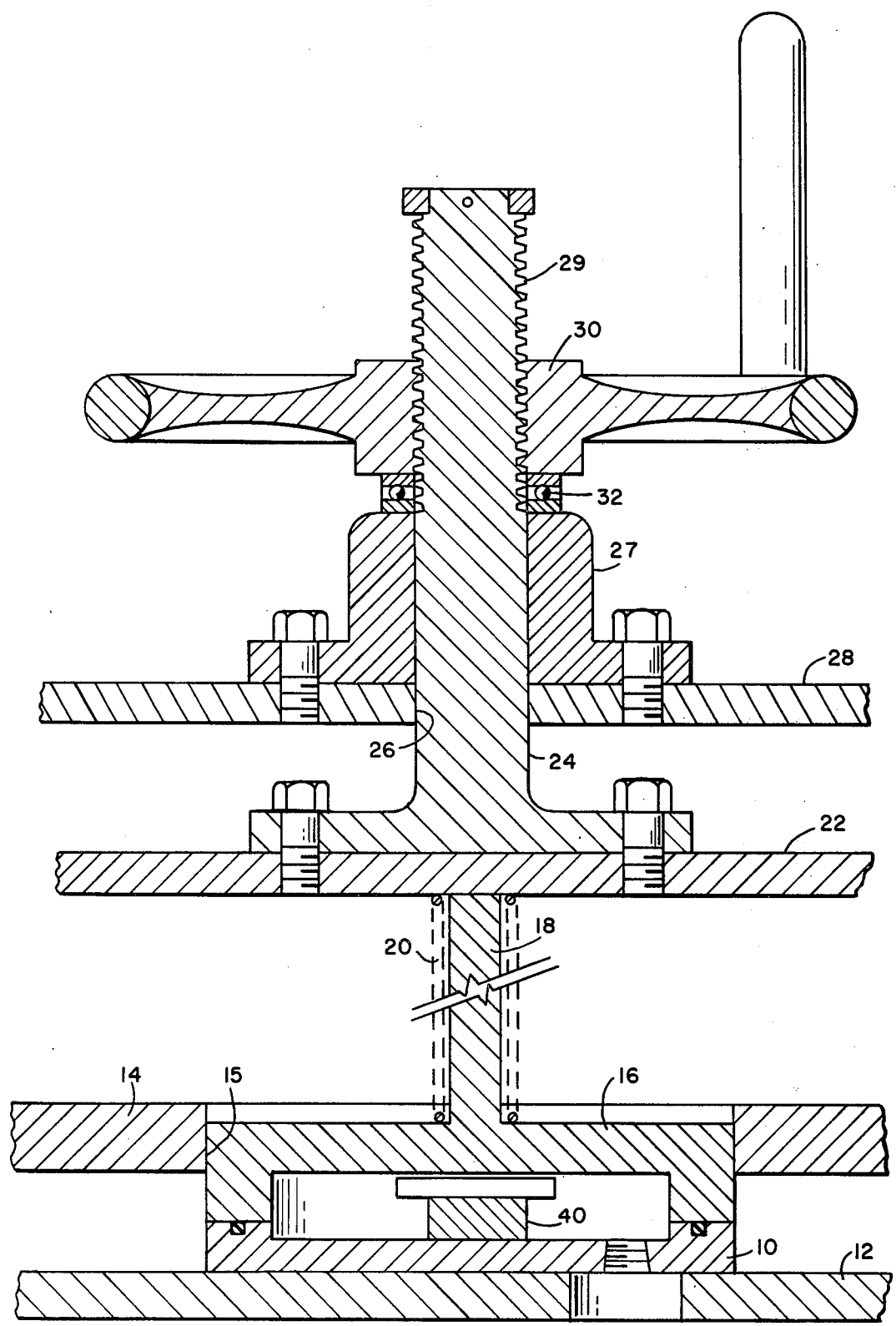
FIG. 3 is an enlarged sectional view illustrating the assembly of the handwheel, chamber tops and bases.

As seen in FIG. 1 a microcircuit fine leak apparatus includes a housing 8 having a plurality of spaced test chamber bases 10 secured to a base 12 of housing 8. Bases 10 are provided with an O-ring seal 11 (FIGS. 2 and 3).

A slidable test chamber cover plate 14 is carried in housing 8. The cover plate includes a plurality of openings 15 (FIGS. 2 and 3) in which a plurality of vertically movable test chamber tops 16 are carried. Each top includes a stem 18 secured to test chamber top 16 and extending through an upper plate 22 and secured thereto by nuts 21. A compression spring 20 is secured around stem 18 and abuts against the upper surface of test chamber top 16 and the lower surface of upper plate 22. A threaded stem 24 is secured to upper plate 22 and extends upwardly through an opening 26 in a smaller top plate 28. A yoke 27 is secured to top plate 28 and stem 24 extends upwardly through the yoke. Stem 24 includes upper threaded portion 29 having a handwheel 30 threadably secured thereon. A thrust bearing 32 is secured between yoke 27 and handwheel 30. A handle 34 is secured to handwheel 30. Top plate 28 is secured to cover plate 14 by anchor bolts 36. Bolts 36 are secured to plate 14 and extend upwardly through top plate 28 and are secured thereto by nuts 36.

To support the microcircuits 38 in each chamber is a block 40. Each block 40 is interchangeable to accomodate different size packages.

Figure 4:
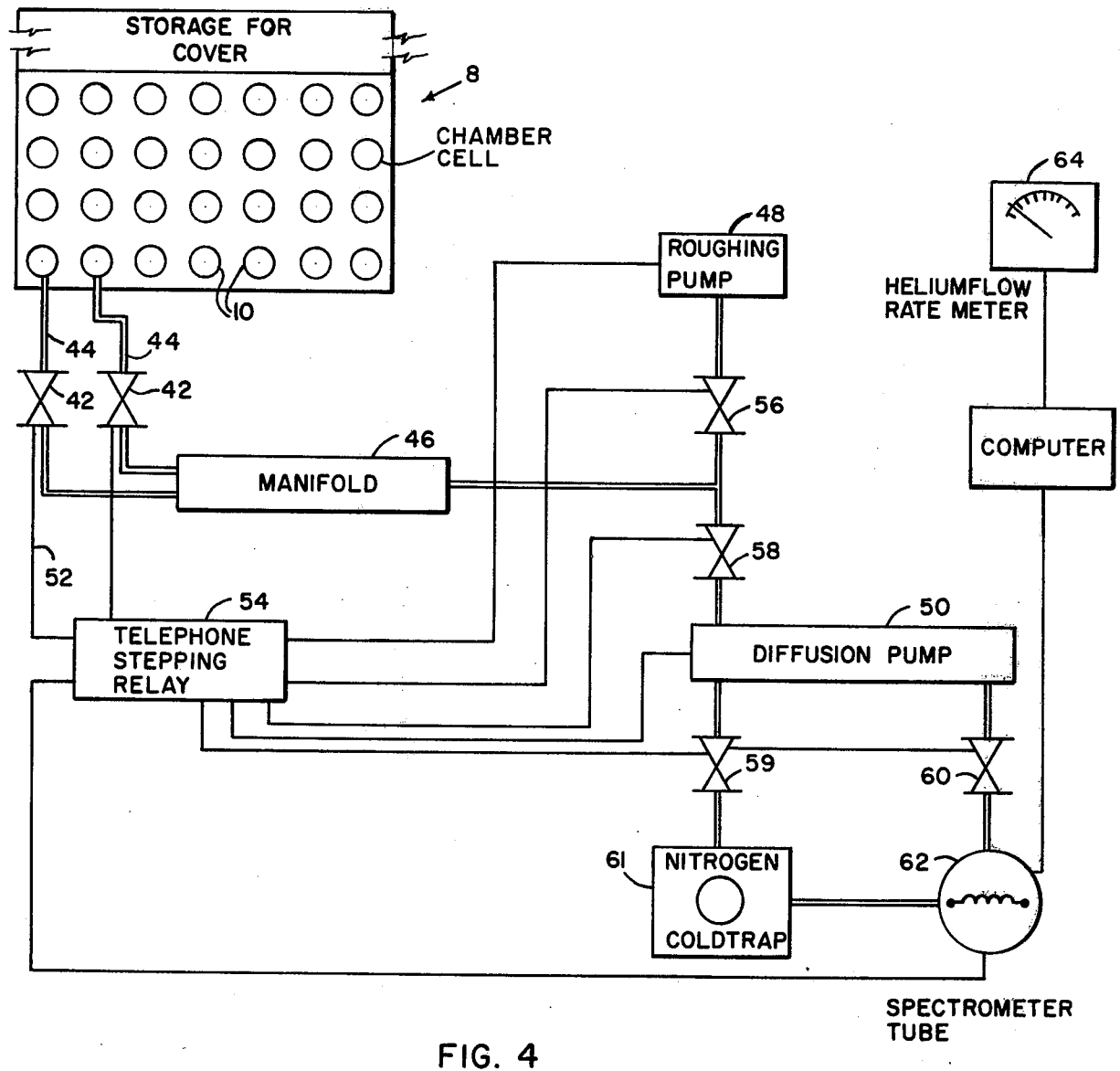
FIG. 4 is a diagrammatic view of the control system.

As seen in FIG. 4, a vacuum solenoid valve 42 is connected by vacuum tubes 44 (only two valves 42 and tubes 44 are shown, for the sake of clarity) to each vacuum chamber base. Each valve is connected to a common manifold 46. The manifold is connected to a roughing pump 48 and to a diffusion pump 50. Each solenoid valve is connected by wires 52 to a telephone stepping relay 54. All chambers are switched open then a roughing vacuum pump valve 56 is opened. Diffusion pump valve 58 is closed. The chambers are rough pumped until the pressure has been reduced to approximately 20 microns. All chambers are then switched off (closed) roughing pump 48, valve 56 is closed and valve 58 to the diffusion pump 50 is opened. The first chamber valve is then switched open to the diffusion pump. Valves 59 and 60 are closed. The diffusion pump reduces the pressure to 0.3 microns. This low pressure is necessary to prevent the spectrometer tube 62 filament from burning out.

A liquid nitrogen cold trap 61 is utilized to remove any other gases from the vacuum system.

The spectrometer tube valves 59 and 60 are opened and helium (if present) will flow into the tube and the operator can monitor the helium flow rate meter 64. FIG. 4 is an illustration of the control system for individual cell testing. However, connections to only a pair of cells are shown for clarity. Devices with an internal cavity volume of 0.1 cc or less shall be rejected if the measured helium gas leak rate exceeds $5 \times 10^{-8}$ atm cc/sec. Devices with an internal cavity volume greater than 0.1 cc shall be rejected, if the measured helium leak rate exceeds $5 \times 10^{-7}$ atm cc/sec. If the package is rejected then the operator records the chamber number. The first chamber valve is switched closed. Test procedures for the first chamber is repeated until 28 packages have been fine leak tested.

The telephone stepping relay 54 is utilized for the fast individual sampling of the chamber gases. After all devices have been tested, all valves to the chambers are switched open and the vacuum is released. The handwheel 30 is rotated, which removes the chamber covers, and the cover is moved back to its storage position position. Reject packages are removed from the indicated chambers first, and placed on a tray. Good packages are removed from the chambers and from the nitrogen environment.

We claim:

1. Apparatus for fine leak testing of sealed tracer gas-filled microcircuit packages comprising:
   (a) a frame disposed for support of a stationary base member and a movable top member:
   (b) a plurality of test chambers disposed in said stationary base member with each test chamber closed by a movable top in said movable top member to receive said microcircuit packages therein;
   (c) vacuum pump means connected to a bottom portion in each said test chambers for evacuation thereof;
   (d) switching means disposed between said vacuum pump means and said test chambers for sequential evacuation of said test chambers; and,
   (e) means communicating with each test chamber for testing the seal of said microcircuit package by measuring the tracer gas leak rate from said package.

2. Apparatus as in claim 1 wherein said means for testing the seal of said microcircuit package is a mass spectrometer.

3. Apparatus as in claim 2 including a plurality of test chamber base members secured to said stationary base member, and, support means carried in said test chamber base members for support of said microcircuit packages thereon.

4. Apparatus as in claim 3 wherein said movable top member is disposed in slidable relation with said frame, said movable top member including a plurality of chambers disposed for alignment and sealed relationship with said test chamber base members prior to evacuation of said chambers.

5. Apparatus as in claim 4 wherein said movable top member includes a top plate, an upper plate, and a third plate, means for securing said upper and third plate in biased relation, and means for moving said upper plate against the bias of said biasing means for the sealed relation of said chambers.

* * * * *